(12) United States Patent
Phillips

(10) Patent No.: US 6,599,052 B1
(45) Date of Patent: Jul. 29, 2003

(54) HUB AND SHAFT COUPLING SYSTEM

(75) Inventor: Allyn E. Phillips, Salem, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/408,635

(22) Filed: Sep. 30, 1999

(51) Int. Cl.$^7$ .............................. F16H 1/20; F16D 1/06; B23P 19/06
(52) U.S. Cl. .............................. 403/367; 403/16; 403/4; 403/374.3; 403/374.4; 403/374.1; 403/370
(58) Field of Search .......................... 403/16, 4, 374.3, 403/374.4, 373, 374.1, 370, 371, 369, 367

(56) References Cited

U.S. PATENT DOCUMENTS

| | | | |
|---|---|---|---|
| 630,176 A | | 8/1899 | Brown |
| 1,065,069 A | * | 6/1913 | Noble ........................ 403/16 |
| 2,459,221 A | * | 1/1949 | Farrington ................... 403/16 |
| 2,680,633 A | | 6/1954 | Brown ...................... 287/20.3 |
| 2,709,374 A | * | 5/1955 | Williams ................ 403/370 X |
| 2,718,155 A | * | 9/1955 | Firth ........................ 403/370 |
| 2,816,452 A | | 12/1957 | McCloskey .............. 74/230.17 |
| 2,889,161 A | | 6/1959 | Powell et al. ............ 287/52.06 |
| 2,899,222 A | * | 8/1959 | Ross ........................ 403/16 |
| 3,143,366 A | * | 8/1964 | Nichols ...................... 403/16 |
| 3,590,652 A | | 7/1971 | Strang ...................... 74/421 |
| 3,917,425 A | | 11/1975 | Allaben, Jr. ................ 403/371 |

(List continued on next page.)

FOREIGN PATENT DOCUMENTS

| | | | | |
|---|---|---|---|---|
| AU | 272852 | | 7/1965 | |
| CA | 603925 | * | 8/1960 | ................ 403/369 |
| GB | 2069660 | * | 8/1981 | ................ 403/370 |
| JP | 56-80524 A | | 7/1981 | ............ F16D/1/08 |
| RU | 566983 | * | 7/1977 | ................ 403/370 |
| RU | 575314 | * | 10/1977 | ................ 403/370 |
| RU | 1656220 | * | 6/1991 | ................ 403/370 |

OTHER PUBLICATIONS

Falk Catalog, Quadrive Model C :Drive Shaft Recommendations, Aug. 1998, 337–140, p. 1.*

(List continued on next page.)

Primary Examiner—Lynne H. Browne
Assistant Examiner—Ernesto Garcia
(74) Attorney, Agent, or Firm—Patrick S. Yoder; Alexander M. Gerasimow; William R. Walburn

(57) ABSTRACT

A technique is disclosed for removably coupling a shaft and hub to one another. The hub includes a pair of tapered regions near ends of its inner peripheral surface. The shaft may be tapered in a region designed to contact one of the tapered surfaces, or a tapered bushing arrangement may be used on the same end. On an opposite end, a tapered bushing is inserted between the shaft and the hub, and interfaces with the tapered portion of the hub to draw the shaft into tight engagement with the hub, with the bushing wedged between, during assembly. A retaining plate abuts a retaining ring, within the bushing, and a fastener through the retaining plate draws the hub and shaft tightly together during assembly. The retaining plate may receive removal fasteners which urge disengagement of the tapered bushing and shaft for easy and controlled disassembly of the hub and shaft from one another for servicing.

21 Claims, 3 Drawing Sheets

U.S. PATENT DOCUMENTS

| | | | | |
|---|---|---|---|---|
| 4,144,755 A | * | 3/1979 | Palloch | 403/16 X |
| 4,364,687 A | | 12/1982 | Adell | 403/370 |
| 4,367,053 A | | 1/1983 | Stratienko et al. | 403/371 |
| 4,398,862 A | * | 8/1983 | Schroeder | 403/14 X |
| 4,402,625 A | * | 9/1983 | Rechkin | 403/16 X |
| 4,452,547 A | * | 6/1984 | Thiel et al. | 403/370 |
| 4,507,005 A | * | 3/1985 | Siewert et al. | 403/16 |
| 4,600,334 A | | 7/1986 | Soussloff | 403/369 |
| 4,626,114 A | | 12/1986 | Phillips | 384/584 |
| 4,652,167 A | * | 3/1987 | Garman | 403/16 |
| 4,734,606 A | * | 3/1988 | Hajec | 310/90.5 |
| 5,174,680 A | | 12/1992 | Nakamura et al. | 403/370 |
| 5,176,464 A | | 1/1993 | Tanner | 403/370 |
| 5,197,345 A | | 3/1993 | Rose | 74/421 |
| 5,374,135 A | | 12/1994 | Folsom et al. | 403/369 |
| 5,474,403 A | | 12/1995 | Hetrich | 403/369 |
| 5,496,127 A | * | 3/1996 | Muller et al. | 403/371 |
| 5,667,333 A | | 9/1997 | Phillips | 403/369 |

OTHER PUBLICATIONS

Dorris Torque Drives, Inc.; "Shaft Mount and Screw Conveyor Gear Drive—Introducing 507TR".

Link–Belt Drives, Model FX Shaft Mounted Speed Reducers Model FC Screw Conveyor Drives.

Link–Belt Drives, Model FX Shaft Mounted Speed Reducers Model FC Screw Conveyor Drives; "Mounting Flexibility, etc.".

Foote–Jones/Illinois Gear; Shaft Mounted and Screw Conveyor Drives.

Dodge Gearing Engineering Catalog.

Falk Drives; "Quadrive 4000J Shaft Mounted Drives with New TA Taper Bushing".

* cited by examiner

HUB AND SHAFT COUPLING SYSTEM

BACKGROUND OF THE INVENTION

1. Field of the Invention

The present invention relates generally to the field of power transmission systems, such as gear reducer systems employing hubs and shafts coupled to one another for input or output of torque. More particularly, the invention relates to a technique facilitating assembly and disassembly of shafts mounted in support hubs, such as an output hub of a gear reducer or similar equipment.

2. Description of the Related Art

A wide range of applications exist for rotary drive systems, throughout all aspects of industry, material handling, agriculture, and transportation, to mention just a few fields. In general, many such systems are based upon the generation of rotary motion which is transmitted to various machine elements through couplings, gear drives, transmissions, and so forth. In systems where a prime mover, such as an electric motor or an internal combustion engine, rotates at a speed other than that desired at the actual application, gear reducers or variable speed drives are typically employed to reduce or increase the speed and torque to the desired range.

The input and output elements of power transmission components must interface with one another to transmit mechanical power reliably, and to withstand loading likely to be encountered in use. Input and output in such systems is often provided by rotating shafts which may be coupled to one another via couplings, sheaves, belts, or similar techniques. In specific applications, however, it is often useful to interface a shaft within a hub designed to receive the shaft, and to transmit power either from the shaft to the hub or vice versa. By way of example, certain gear reducers are designed with an input shaft and an output hub internally coupled to one another via intermeshing gears and pinions. The machine is designed to be secured firmly to an output shaft which is inserted in the hub. A range of coupling and support configurations have been designed and are presently in use for insuring reliable power transmission in such arrangements, while offering resistance to additional loading provided by the coupling system itself.

In one known mounting and coupling arrangement for rotational power transmission systems, a tapered bushing inserted between a shaft and a hub serves to lock the shaft and hub with respect to one another when the system is fully assembled. The tapered bushing may interface directly with corresponding tapered portions of the hub or the shaft, and is generally wedged axially into tight engagement therebetween by axial displacement of the hub, the shaft, the bushing, or more than one of these elements. For machines designed to be hung onto output or input shafts, such as shaft-mounted gear reducers and torque arms, a pair of tapered bushings may be employed at either end of the hub, or at one end and an intermediate position, to provide adequate support for the hub on the shaft. Single tapered bushing arrangements have also been developed for this purpose.

While mounting and coupling arrangements of the type described above provide excellent power transmission capabilities and good mechanical support, they are not without drawbacks. For example, in hub-mounted gear reducers systems, tapered bushings may be pressed between the hub and the shaft during assembly, or the shaft may be directly interfaced with a tapered portion of the hub at one end. Flanged arrangements with threaded fasteners are then typically employed for forcing tight engagement of the tapered surfaces with one another. For subsequent servicing, however, the tight engagement of the tapered surfaces, and the tight wedged engagement of the tapered bushing between the shaft and hub make disassembly extremely time consuming and difficult. In practice, various hand tools, hoists, pullers, and the like may be employed in an attempt to separate the machine elements from one another, sometimes resulting in damage or destruction of one or more of the elements, leading to additional down time and cost.

There is a need, therefore, for an improved technique for assembling and disassembling mechanical components such as a hub and shaft. There is, at present, a particular need for a simple and straightforward system which can be retrofitted into existing power transmission systems, or installed in new systems to facilitate both assembly and disassembly. Such a technique would advantageously build from certain existing product configurations, reducing the overall system redesign, particularly in retrofitted systems.

SUMMARY OF THE INVENTION

The invention provides a novel technique for assembling hubs and shafts in mechanical power transmission systems designed to respond to these needs. The technique employs a tapered bushing approach to the mechanical support of the hub and shaft with respect to one another. A tapered bushing may be positioned between the hub and shaft at least one end of the system. A similar tapered bushing may be provided at the opposite end, or a tapered region of the shaft may be directly interfaced with a tapered portion of the bushing. The system is drawn into tight engagement by a fastener secured through a retaining or keeper plate which interfaces with the tapered bushing. The keeper plate and fastener arrangement form a low-profile structure which may facilitate reduction of overhung loads in the power transmission arrangement.

The technique facilitates uncoupling and removal of the shaft and hub in a straightforward manner. In a preferred arrangement, the retaining structure may interface with fasteners which urge the shaft and hub out of engagement with one another following removal of the securement fastener. The retaining plate structure may be reversible, such that it serves to maintain a retaining fastener in tension during normal operation, while supporting removal fasteners in compression during removal of the shaft and hub from one another for servicing. The system thus permits the shaft and hub to be solidly supported via taper locking arrangements during use, and removed from one another in a simple and controlled manner when desired.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
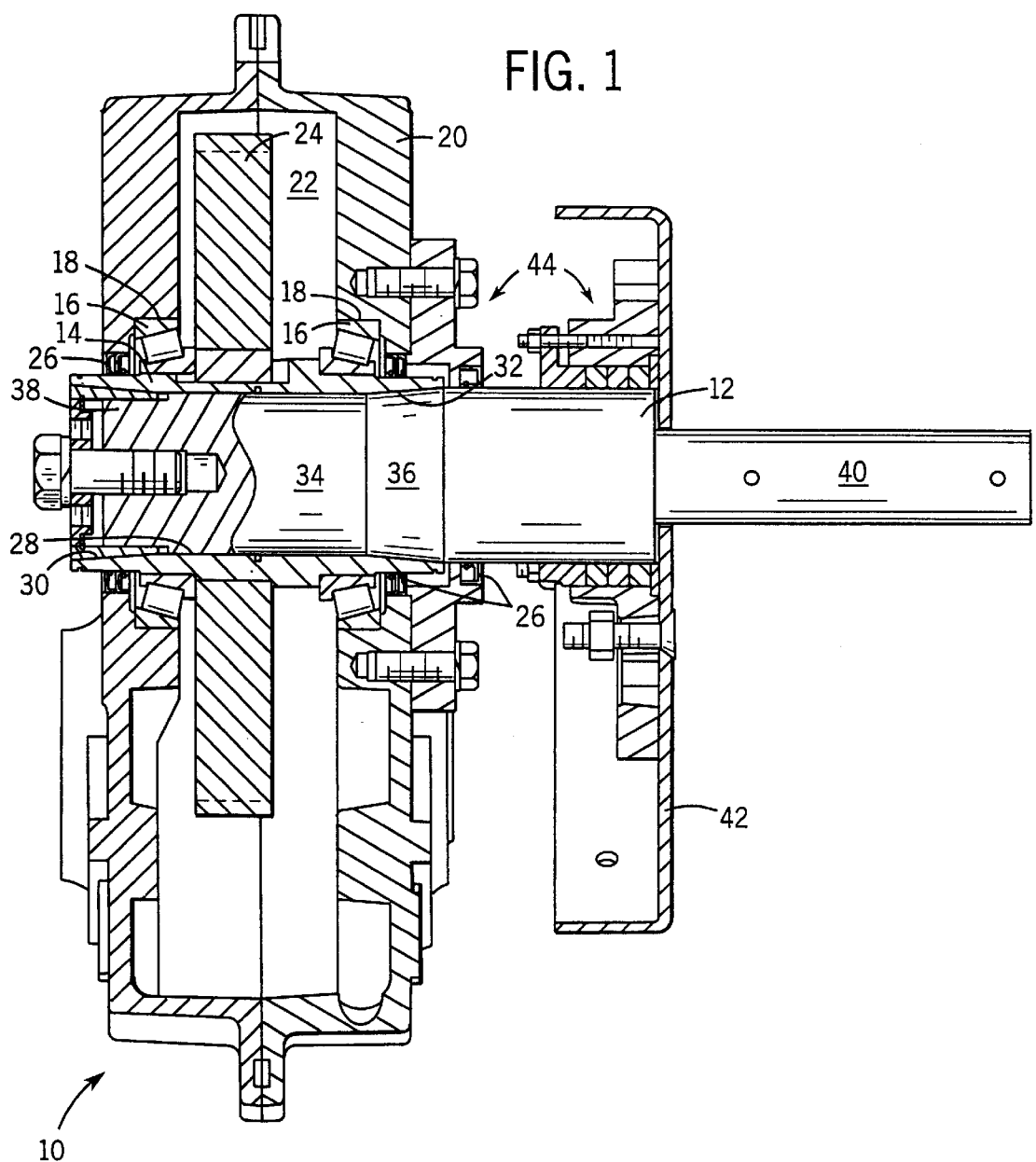
FIG. 1 is a partial sectional view of a gear reducer having an output hub and a shaft coupled to and removable from the hub in accordance with certain aspects of the present technique.

Turning now to the drawings, and referring first to FIG. 1, a mechanical power transmission arrangement is illustrated as including a gear reducer 10 mounted on a support shaft 12. In the arrangement illustrated in the Figures, gear reducer 10 may be a single or multiple-stage gear reducer. Other components of the arrangement illustrated are specifically adapted to a screw conveyor system. It should be noted, however, that the specific machinery, components, and configurations described herein are in no way limited to any particular system type or application, but may be applied to any suitable system in which the mounting and removal techniques may be usefully employed.

In the illustrated embodiment, shaft 12 is separable from the gear reducer. Gear reducer 10 is supported by a machine support structure which may include a support adapter (designated by reference numeral 44). Other support structures may, of course, be employed, and gear reducer 10 may be designed to be supported on output shaft 12 as an overhung load. To receive the shaft and support the gear reducer, the gear reducer includes an output hub 14 which supports the shaft at either end thereof, as described more fully below. In a presently preferred arrangement illustrated in the drawings, a central region 34 of the shaft is not directly supported by the hub, and may be spaced from the inner periphery of the hub in order to reduce the potential for fretting of the shaft during use. The hub itself is supported by a pair of bearings 16 mounted within bearing supports 18 of the gear reducer housing 20. The particular machinery in which the hub is installed may vary, depending upon the application. In the illustrated embodiment, however, the gear reducer housing 20 defines an internal cavity 22 in which gearing, designated generally by reference numeral 24, is positioned. Although not illustrated in FIG. 1, the gearing will typically include pinions and gearing for driving hub 14 in rotation, in response to power input via an input shaft. The particular nature of the hub, and its functioning with other system components, however, may be reversed such that the technique described below could also be employed with power input hubs.

On either side of bearings 16, gear reducer 10 is preferably provided with seal assemblies 26 designed to reduce the ingress of contaminants from outside the machine, and to maintain lubricant within the machine. Between the ends of the hub, a generally cylindrical inner periphery is defined, including a central portion 28, generally a right cylinder, and tapered end portions 30 and 32. The tapered portions of the inner periphery of the hub open toward outboard regions, such that matching tapered components may be interfaced therewith as described below.

Shaft 12, in a region designed to be received within hub 14, includes a right cylindrical central portion 34 bounded by a tapered portion 36 at one end, and a cylindrical end portion 38 of reduced diameter at an opposite end. As described below, the ends of the shaft are configured to permit locking of the shaft in a desired position within the hub via tapered bushings, or by direct interface between tapered portions 32 and 36. Alternatively, tapered portion 32 may interface with a tapered bushing positioned between tapered portion 32 and shaft 12.

In the illustrated application, shaft 12 includes an output extension 40 designed to be secured to a downstream mechanical component, such as a screw conveyer auger (not shown). In this application, the shaft extends through a screw conveyer trough end plate 42 and is bounded by a seal assembly within a support adapter 44 to reduce the transmission of fluids and contaminants through end plate 42 toward the gear reducer. It should be noted that while appearing as two separate components in FIG. 1, adapter 44 is preferably a single-piece structure with the illustrated flanges and seal assemblies being joined by arms or standoffs (not shown in the Figures for clarity).

Figure 2:
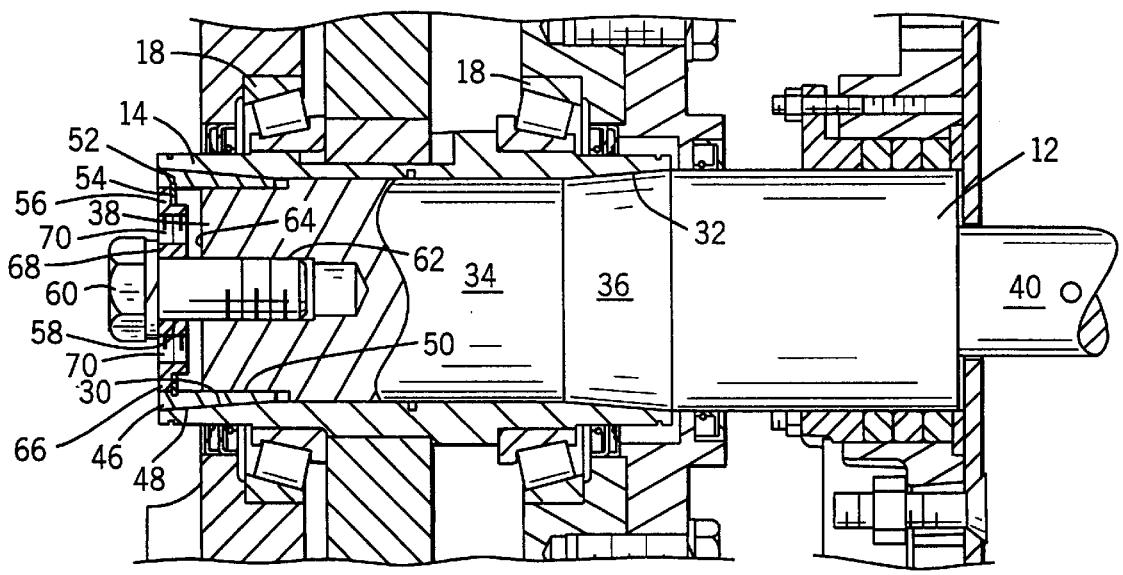
FIG. 2 is a detail view of a portion of the structure shown in FIG. 1 illustrating in greater detail the components used to secure the hub and shaft to one another.

As best illustrated in FIG. 2, components are provided for interfacing between the shaft 12 and hub 14, and for locking these components with respect to one another during installation and use. It should be noted first that hub 14 preferably transmits torque to shaft 12 via a conventional key and keyway arrangement (not shown). In the illustrated embodiment, inner tapered portion 32 of hub 14 is drawn into firm engagement with tapered portion 36 of shaft 12 to support the shaft at one end of the gear reducer. At an opposite end of the gear reducer (to the left in FIG. 2), a tapered bushing 46 is positioned between the cylindrical end portion 38 of shaft 12, and the tapered portion 30 of the hub. Tapered bushing 46 includes a tapered outer wall 48, designed generally to match the taper of portion 30 of the hub, and a cylindrical inner wall 50 designed to fit snugly around end portion 38 of the shaft. Tapered bushing 46 may further include a longitudinal break or slot (not shown), permitting it to be flexed somewhat radially for tight compression between the hub and shaft during installation.

Tapered bushing 46 is forced into a tight fit between the hub and shaft during installation by drawing the shaft into the hub such that tapered portion 32 of the hub abuts tapered portion 36 of shaft 12. For this purpose, an abutment ring groove 52 is formed around the cylindrical inner periphery of tapered bushing 46 and abutment ring 54 is secured therein. In a preferred embodiment, an abutment ring 54 is a snap ring fitted within the inner peripheral groove 52. A retaining plate 56 is positioned within tapered bushing 46 and rides against abutment ring 54. Retaining plate 56 includes a central aperture 58 designed to receive a fastener 60 therethrough. A threaded bore 62 is formed into shaft 12 internally extending from an end surface 64. Fastener 60 is received within the threaded bore 62 and is engaged in the bore during installation to draw the system into tight engagement.

In the embodiment illustrated, for installation the abutment ring 54 is positioned within groove 52, and shaft 12 is positioned within hub 14 as illustrated. Fastener 60 is then fed through aperture 58 and threaded into bore 62. Progressive engagement of the fastener within the threaded bore ultimately forces an annular flange portion 66 of retaining plate 56 against abutment ring 54. Further engagement both draws the shaft 12 toward the tapered bushing 46, engaging surfaces 32 and 36 against one another, and draws the tapered bushing 46 into tight engagement between the cylindrical end portion 38 of the shaft and the tapered portion 30 of the hub. Once these components are tightly engaged with one another, the shaft is supported at two locations separated from one another by a sufficient distance to provide the necessary support. In the preferred embodiment illustrated, the supports are located adjacent to the bearing assemblies 18 supporting the hub in the gear reducer housing.

Several advantages have been found in the foregoing structure. Firstly, the structure facilitates assembly of the shaft and hub components, reducing the number of separate elements which must be aligned and engaged for support.

Where desired, however, multiple fasteners 60 may be provided, each associated with a corresponding aperture through the retaining plate, and a threaded bore within the shaft. Moreover, as compared to heretofore known flange-type tapered bushing arrangements, the retaining plate structure and tapered bushing may be essentially flush with the end of the hub, or may even be positioned inboard of the hub when fully engaged. Thus, where other components, such as an electric motor, are associated with the system (such as for driving an input shaft of the gear reducer via a sheave and belt drive), the amount of overhung load of the input shaft and motor may be reduced by the relatively close clearance between the securement system and the end of the gear reducer housing.

Figure 3:
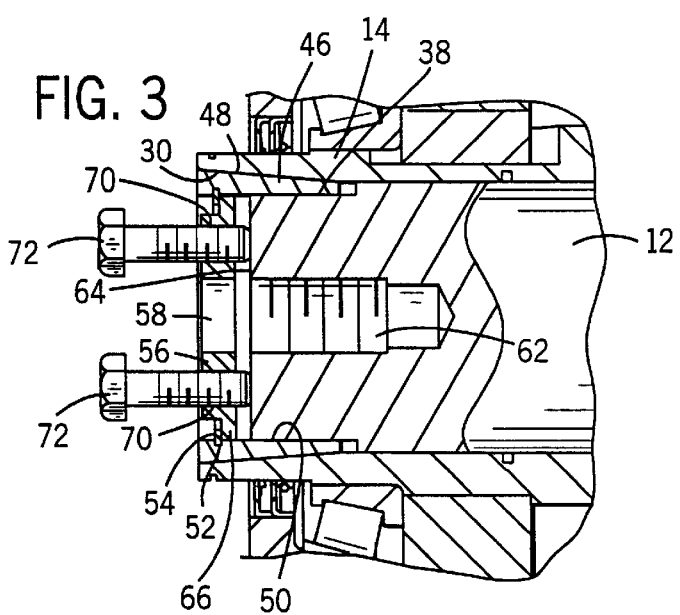
FIG. 3 is a partial sectional view of a technique for controlled disengagement of the hub and shaft based upon the coupling structure of FIG. 2.
Figure 4:
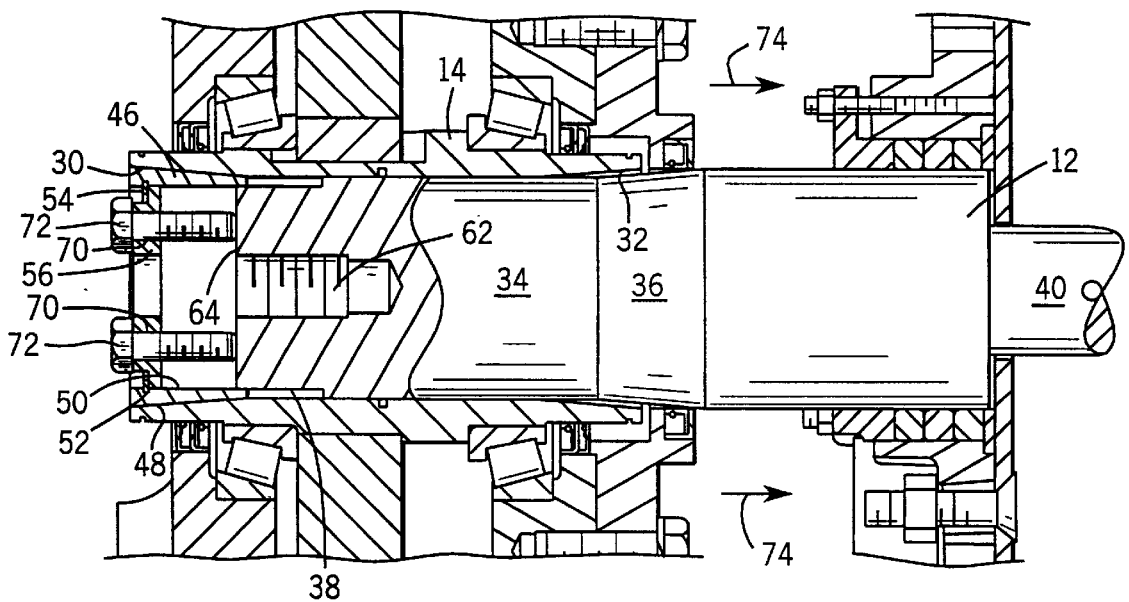
FIG. 4 is a partial sectional view of the structure shown in FIG. 3 following progressive ejection of the shaft from engagement with a tapered bushing used to secure the shaft within the hub.

The foregoing structure also facilitates removal of the shaft from the hub for servicing, as best illustrated in FIGS. 3 and 4. As shown in FIG. 3, in addition to aperture 58, retaining plate 56 is provided with one or more threaded apertures 70 for receiving threaded fasteners 72 used to urge disengagement of the shaft 12 from the tapered bushing 46 and hub 14. In the illustrated embodiment, the retaining structure is designed for reversal of the retaining plate for dismantling of the shaft and hub arrangement. Specifically, contrasting with the arrangement as illustrated in FIGS. 1 and 2, for removal, the abutment ring 54 is removed from groove 52, and retaining plate 56 is reversed and reinserted into the tapered bushing 46. The abutment ring is then replaced within the groove, effectively enclosing the retaining plate between the abutment ring and the end surface 64 of the shaft. Fasteners 72 are then threaded into bores 70 until they contact the end of the shaft as illustrated in FIG. 3. Subsequent further engagement of the fasteners within the threaded bores 70 forces the shaft and tapered bushing apart, as best illustrated in FIG. 4 and as indicated by arrows 74.

It should be noted that in the illustrated embodiment, the removal includes disengagement of tapered surfaces 32 and 36 from one another at an opposite end of the gear reducer. In practice, relative motion may occur between the tapered bushing and the hub, between the hub and the shaft, or both. Upon full engagement of the fasteners within the threaded bores, the mounting system is entirely released, and the hub and shaft may be separated, and the tapered bushing 46 removed freely.

While the invention may be susceptible to various modifications and alternative forms, specific embodiments have been shown and described herein by way of example only. However, it should be understood that the invention is not intended to be limited to the particular forms disclosed. Rather, the invention is to cover all modifications, equivalents, and alternatives falling within the spirit and scope of the invention as defined by the following appended claims. For example, in the preferred arrangement described above, retaining plate 56 is retained by a single abutment member, and is reversed in the assembled and disassembled positions. Alternatively, a shoulder or similar abutment element may be defined within the tapered bushing, with the abutment ring being employed to capture the retaining plate within the bushing, eliminating the need to reverse the retaining plate for removal of the tapered bushing. Similarly, a pair of abutment rings may be employed on either side of the retaining plate. Also, where desired, a tapered bushing arrangement, such as a conventional flanged bushing and retainer, may be employed in lieu of the tapered shaft portion 36 on an end of the hub opposite from the retaining plate arrangement. Finally, where the space constraints of the system make the use of a flanged-type bushing impractical, a tapered bushing arrangement may be situated within the hub to add additional support between the hub ends.

What is claimed is:

1. A coupling system comprising:
   a hub having first and second ends, and including a first tapered portion adjacent to the first end and a second tapered portion adjacent to the second end;
   a shaft positionable within the hub through the second end, the shaft having an end portion and a threaded bore formed in the end portion;
   a tapered bushing positionable between the shaft and the hub adjacent to the first end of the hub, the tapered bushing contacting the first tapered portion of the hub;
   a retainer engaging the tapered bushing to urge the tapered bushing into engagement between the hub and shaft, the retainer having a first aperture therethrough;
   an abutment ring secured between the tapered bushing and the retainer, the retainer abutting the abutment ring to draw the tapered bushing into engagement between the hub and the shaft, the retainer being selectively positionable between a first side of the abutment ring for engagement of the tapered bushing between the hub and shaft and a second side of the abutment ring for disengagement of the tapered bushing from the hub and the shaft; and
   a securement fastener received through the aperture of the retainer and into the threaded bore of the shaft to draw the tapered bushing into tight engagement between the hub and the shaft.

2. The system of claim 1, further comprising a removal member, and wherein the retainer is configured to receive the removal member and to interface with the removal member to exert a removal force between the retainer and the shaft for disengagement of the tapered bushing and the shaft.

3. The system of claim 2, wherein the retainer includes a second aperture and the removal member is a threaded fastener engageable in the second aperture.

4. The system of claim 3, wherein the first aperture of the retainer is located in a generally central region thereof, and wherein the retainer includes a plurality of second apertures disposed radially outwardly of the central region for receiving respective threaded fasteners for removal of the tapered bushing from the shaft.

5. The system of claim 1, wherein the abutment ring is a snap ring fitted within a groove formed in an internal periphery of the tapered bushing.

6. The system of claim 1, wherein the shaft includes a tapered portion distal from the end portion, and wherein engagement of the tapered bushing between the hub and the shaft forces engagement of the tapered portion of the shaft with the second tapered portion of the hub.

7. The system of claim 1, wherein the tapered bushing is disposed substantially flush with or within an end of the hub when engaged between the hub and shaft.

8. A coupling system comprising:
   a hub having first and second ends;
   a shaft positionable within the hub through the second end, the shaft having an end portion and a threaded bore formed in the end portion;
   a tapered bushing positionable between the shaft and the hub adjacent to the first end of the hub;
   a retainer engaging the tapered bushing to urge the tapered bushing into engagement between the hub and the shaft, the retainer having a first aperture and a second aperture therethrough, the second aperture being threaded;

a securement fastener engageable through the first aperture of the retainer and into the threaded bore of the shaft to draw the tapered bushing into tight engagement between the hub and the shaft;

an abutment ring secured between the tapered bushing and the retainer, the retainer contacting the abutment ring for drawing the tapered bushing into engagement between the hub and the shaft, the retainer being selectively positionable between a first side of the abutment ring for engagement of the tapered bushing between the hub and the shaft and a second side of the abutment ring for disengagement of the tapered bushing, and a removal fastener engageable within the second aperture of the retainer to exert a removal force between the retainer and the shaft for disengagement of the tapered bushing and the shaft.

9. The system of claim 8, wherein the abutment ring is a snap ring fitted within a groove formed in an internal periphery of the tapered bushing.

10. The system of claim 8, wherein the hub includes a first tapered portion adjacent to the first end and a second tapered portion adjacent to the second end, and wherein the tapered bushing contacts the first tapered portion.

11. The system of claim 10, wherein the shaft includes a tapered portion distal from the end portion, and wherein engagement of the tapered bushing between the hub and the shaft forces engagement of the tapered portion of the shaft with the second tapered portion of the hub.

12. The system of claim 8, wherein the tapered bushing is disposed substantially flush with or within an end of the hub when engaged between the hub and shaft.

13. A coupling system comprising:

a hub having first and second ends, and including a first tapered portion adjacent to the first end and a second tapered portion adjacent to the second end;

a shaft positionable within the hub through the second end, the shaft having an end portion and a threaded bore formed in the end portion;

a tapered bushing positionable between the shaft and the hub adjacent to the first end of the hub, the tapered bushing contacting the first tap portion of the hub;

a retainer engaging the tapered bushing to urge the tapered bushing into engagement between the hub and the shaft, the retainer including a central aperture located in a generally central region thereof and a plurality of threaded apertures disposed radially outwardly of the central region for receiving respective threaded fasteners engaging the shaft for removal of the tapered bushing from the shaft; and a securement fastener received through the central aperture of the retainer and into the threaded bore of the shaft to draw the tapered bushing into tight engagement between the hub and the shaft.

14. The system of claim 13, further comprising an abutment ring secured between the tapered bushing and the retainer, the retainer exerting force against the abutment ring to force engagement of the tapered bushing between the hub and shaft.

15. The system of claim 14, wherein the abutment ring is a snap ring fitted within a groove formed in an internal periphery of the tapered bushing.

16. The system of claim 13, wherein the tapered bushing is disposed substantially flush with or within an end of the hub when engaged between the hub and shaft.

17. A coupling system comprising:

a hub having first and second ends, and including a first tapered portion adjacent to the first end and a second tapered portion adjacent to the second end;

a shaft positionable within the hub through the second end, the shaft having an end portion and a threaded bore formed in the end portion;

a tapered bushing positionable between the shaft and the hub adjacent to the first end of the hub, the tapered bushing contacting the first tapered portion of the hub, wherein the tapered bushing is disposed substantially flush with or within an end of the hub when engaged between the hub and the shaft;

a retainer adapted to engage the tapered bushing to urge the tapered bushing into engagement between the hub and the shaft, the retainer including a first, central aperture located in a generally central region thereof and a plurality of second, threaded apertures disposed radially outwardly of the central region for receiving respective threaded fasteners engaging the shaft for removal of the tapered bushing from the shaft;

a securement fastener engageable through the first aperture of the retainer and into the threaded bore of the shaft to draw the tapered bushing into tight engagement between the hub and the shaft; and removal fasteners engageable within the second apertures of the retainer to exert a removal force between the retainer and the shaft for disengagement of the tapered bushing and the shaft.

18. The system of claim 17, further comprising an abutment ring secured between the tapered bushing and the retainer, the retainer contacting the abutment ring for drawing the tapered bushing into engagement between the hub and shaft.

19. The system of claim 18, wherein the retainer is adapted to be selectively positionable on a first side of the abutment ring for engagement of the tapered bushing between the hub and shaft, and on a second side of the abutment ring for disengagement of the tapered bushing.

20. The system of claim 18, wherein the abutment ring is a snap ring fitted within a groove formed in an internal periphery of the tapered bushing.

21. A coupling system comprising:

a hub having first and second ends, the hub including a first tapered portion adjacent to the first end and a second tapered portion adjacent to the second end;

a shaft positionable within the hub through the second end, the shaft having an end portion and a threaded bore formed in the end portion, the shaft including a tapered portion distal from the end portion;

a tapered bushing positionable between the shaft and the hub adjacent to the first end of the hub, the tapered bushing contacting the first tapered portion of the hub;

a retainer engaging the tapered bushing to urge the tapered bushing into engagement between the hub and the shaft, the retainer having a first aperture and a second aperture therethrough, the second aperture being threaded;

a securement fastener engageable through the first aperture of the retainer and into the threaded bore of the shaft to draw the tapered bushing into tight engagement between the hub and the shaft; and a removal fastener engageable within the second aperture of the retainer to exert a removal force between the retainer and the shaft for disengagement of the tapered bushing and shaft;

wherein engagement of the tapered bushing between the hub and the shaft forces engagement of the tapered portion of the shaft with the second tapered portion of the hub.

* * * * *